G. H. LANGTON.
WHEEL.
APPLICATION FILED AUG. 10, 1908.
973,054.
Patented Oct. 18, 1910.
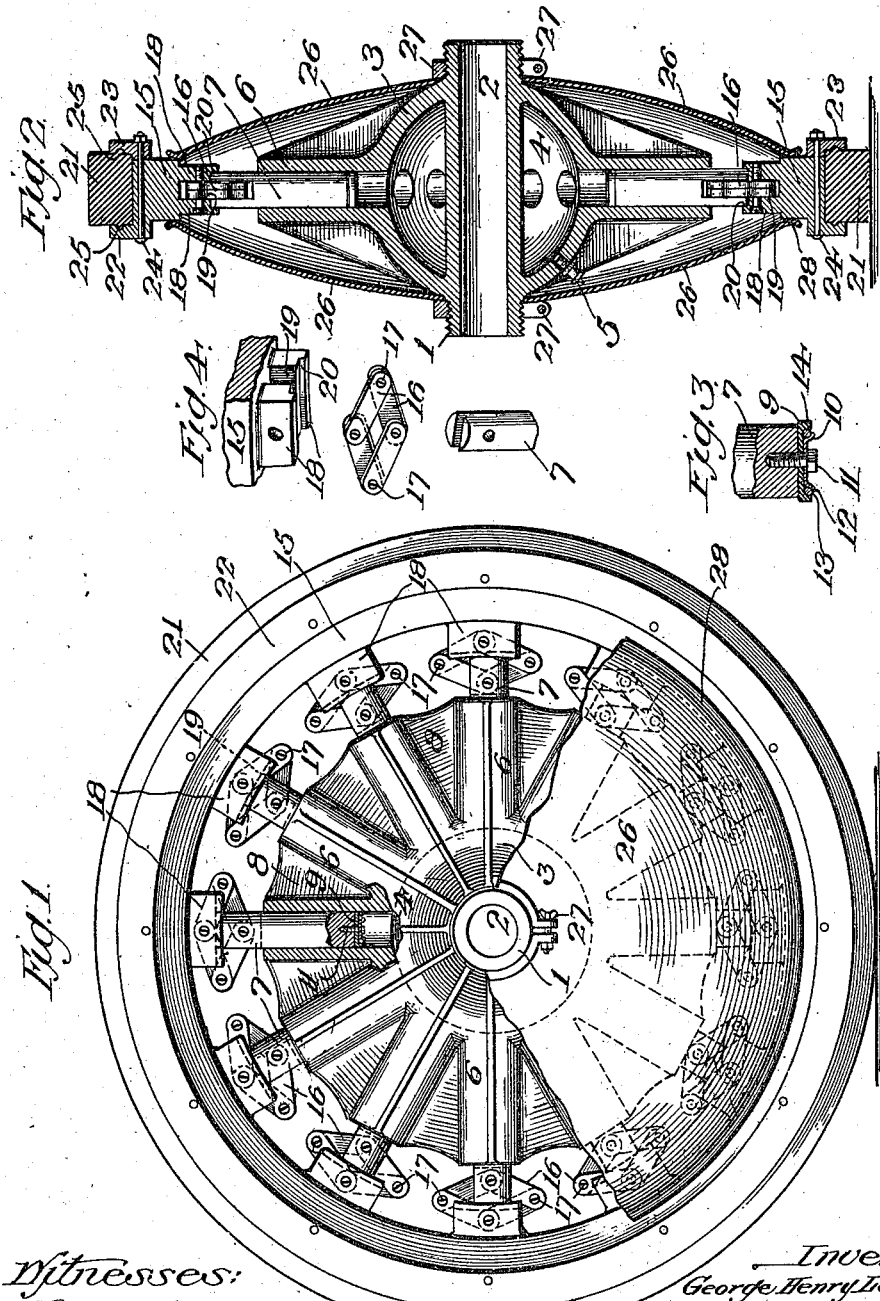

UNITED STATES PATENT OFFICE.

GEORGE HENRY LANGTON, OF LOS ANGELES, CALIFORNIA.

WHEEL.

973,054.  Specification of Letters Patent.  Patented Oct. 18, 1910.

Application filed August 10, 1908. Serial No. 447,880.

*To all whom it may concern:*

Be it known that I, GEORGE HENRY LANGTON, a citizen of the United States, residing in Los Angeles, in the county of Los Angeles and State of California, have invented a new and useful Improvement in Wheels, of which the following is a specification.

This invention relates to wheels commonly used on automobiles and more particularly to that class of wheels in which compressed air is utilized for a cushioning effect between the rim and tire or the axle and tire or axle and rim.

One object of this invention is to provide a wheel that will increase the efficiency of wheels by utilizing compressed air in the hub and spokes connected to a solid tire in a manner so that spokes can oscillate with the tire in all directions except laterally or sidewise to the tire or rim.

Another object is to utilize the hub and spokes for an air chamber by making them hollow and providing means for yieldingly holding the hub concentric within the rim and thereby utilizing the air as a cushion.

Another object is to flexibly connect the outer ends of the spoke members with the rim and also to provide means for supporting them rigidly against further outward movement beyond a certain limit.

With these and other objects in view the invention consists in the improved construction and novel arrangement of parts of a wheel as will be hereinafter more fully set forth.

The accompanying drawings illustrate an embodiment of the invention and form a part of this specification.

Figure 1 is a broken side elevation of a wheel made in accordance with my invention. Fig. 2 is a vertical, transverse, sectional view of the same. Fig. 3 is an enlarged, sectional, detail view. Fig. 4 is a detail view showing the means for connecting the end of the spoke member with the felly, the parts being detached.

Referring more particularly to the drawings which are for illustrative purposes only and, therefore, are not drawn to any particular scale, 1 indicates the hub of the wheel which is provided with a central cylinder portion 2 that is adapted to engage with the spindle or axle in the usual manner. An annular wall 3 surrounds the central portion or boxing 2 and is secured thereto at its ends so as to form a chamber or cavity 4 surrounding said member, within which air is adapted to be introduced and compressed in any suitable manner, as through the ordinary valve 5. The wall 3 is preferably semi-cylindrical in cross section, as shown more particularly in Fig. 2, which gives the hub a symmetrical effect, and hollow arms or projections 6 project radially therefrom for the reception of the spoke members 7. Strengthening ribs 8 are preferably provided which are joined to the wall 3 and to the sides of the projections or spoke cylinders 6 and thereby secure greater rigidity for the cylinders to resist lateral strain.

The spokes or pistons 7 are adapted to each reciprocate freely within its cylinder 6 and has its inner end provided with a washer or packing 9 formed from any suitable material, as leather, and which is secured in position, as by means of a disk 10 and screws 11. The edge of the disk 10 is preferably beveled or inclined as shown at 12, and a ring 13 is seated between said beveled portion and the flange 14 of the washer 9 which will thereby always insure perfect contact with the walls of the cylinder 6 and thus prevent the escape of the air from the chamber 4. The outer end of each spoke or piston 7 is flexibly connected with the rim or felly 15 in any suitable manner, as by means of the toggles 16. These toggles are preferably formed from flat strips of metal which are pivotally secured together at two of their ends by rivets or counter-sunk screws 17, and the other two ends are pivotally secured in the outer ends of the spokes 7 and in lugs or projections 18 respectively, said lugs projecting inwardly from the rim 15 in alinement with the cylinders 6.

The inner face of each of the lugs 18 is provided with two grooves or recesses 19 and 20 which are arranged to extend circumferentially of the rim, and the ends of the toggles 16 are pivotally mounted in the recess 19 which extends outwardly from the bottom of the recess 20 and the outer end of the spoke or piston 7 is normally held in engagement with the bottom of the inner recess 20 by the outward pressure of the air in the chamber 4. In this manner the rim is yieldingly supported concentrically with the hub upon a cushion of compressed air which will thereby secure substantially the same result as though the cushion of air were located in the tire, as with the ordinary pneumatic tire.

In case of the descent of the hub toward the tire, as from the weight of the load or the upward movement of the tire in passing over obstructions, the lower cylinders 6 will slide vertically upon their respective pistons while the upper ones will be moved downward off their pistons and the outer ends of the horizontal and intermediate pistons will be moved substantially in straight lines relatively to their respective connections upon the rim at a greater or less angle depending upon the relative positions of the intermediate spokes, the toggles permitting such movement without interfering with the free movement of the ends of the spokes 7 with the bottom of their respective grooves or recesses 20, as indicated more particularly by the position of the horizontal spokes in Fig. 1.

To add to the resiliency of the wheel which is secured by cushioning the spokes in this manner, the rim 15 may be provided with a tire 21 of yielding material, as rubber, which is clamped between flanges 22 and 23, the flange 23 being removable and held in position by means of bolts 24. The inner face of each flange is preferably recessed circumferentially, within which recesses are seated ribs 25 formed upon the sides or faces of the tire 21.

Dust shields or guards 26 are preferably secured to the sides of the wheel, as by means of clamp nuts 27 that are screwed upon the outer ends of the boxing 2 and hold the shields against the wall 3. The shields are preferably concaved or made dish-shaped so that their edges which are preferably curved outward, as shown at 28, will yieldingly engage with the sides of the rim 15 and permit perfectly free movement of the parts of the wheel as above described without permitting dust or other foreign substances to enter.

By constructing a wheel as above described it can be made comparatively cheap by forming the boxing and the cylinders integral with the hub and coring them out so as to form a unitary structure. The spokes or pistons are then inserted in the outer ends of the cylinders and extend nearly into the cavity 4, as shown more particularly in Fig. 2, which will permit freedom of movement inwardly to the extent of the engagement of the toggles with the outer ends of the cylinders without permitting the inner ends of the pistons to enter the chamber 4. The interior of the wheel is then filled with air and compressed to any desired extent by means of the ordinary pump used for inflating the pneumatic tire, the amount of compression being such as to secure the desired degree of resiliency for the wheel.

Having described my invention, I claim:

In a wheel, a hollow hub provided with radially extending hollow cylinders, a piston in each cylinder, a rim around said pistons provided with an inwardly extending projection for registering with each cylinder, the inner face of said projection being provided with two circumferentially arranged recesses, one extending outwardly from the bottom of the other and of less width than the inner recess, and toggles pivotally secured in the outer end of the spoke and the projection respectively, the outer end of the spoke being adapted to be normally seated against the bottom of the inner recess.

In testimony whereof, I have hereunto set my hand at Los Angeles, California, this 3rd day of August, 1908.

GEORGE HENRY LANGTON.

In presence of—
  F. M. TOWNSEND,
  GEO. L. BERGER.